(12) United States Patent
Meserth et al.

(10) Patent No.: US 7,958,447 B2
(45) Date of Patent: Jun. 7, 2011

(54) METHOD AND SYSTEM FOR PAGE NAVIGATING USER INTERFACES FOR ELECTRONIC DEVICES

(75) Inventors: Timothy A. Meserth, Durham, NC (US); Mark E. Molander, Cary, NC (US); Thomas J. Sluchak, Apex, NC (US); Jeffrey J. Smith, Raleigh, NC (US); David T. Wendell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 12/126,009

(22) Filed: May 23, 2008

(65) Prior Publication Data
US 2009/0293009 A1 Nov. 26, 2009

(51) Int. Cl.
G06F 17/00 (2006.01)
G06F 3/041 (2006.01)
G06F 3/048 (2006.01)
G09G 5/00 (2006.01)

(52) U.S. Cl. ........ 715/251; 715/243; 715/776; 345/156; 345/173; 345/178

(58) Field of Classification Search .......... 715/243, 715/251, 776; 345/156, 173, 178
See application file for complete search history.

(56) References Cited

U.S. PATENT DOCUMENTS

| 5,847,698 | A | * | 12/1998 | Reavey et al. | 345/173 |
| 6,320,591 | B1 | | 11/2001 | Griencewic | |
| 7,071,915 | B2 | | 7/2006 | Liang et al. | |
| 7,496,829 | B2 | * | 2/2009 | Rubin et al. | 715/243 |
| 2003/0013073 | A1 | * | 1/2003 | Duncan et al. | 434/317 |
| 2003/0071800 | A1 | * | 4/2003 | Vincent et al. | 345/204 |
| 2003/0122689 | A1 | * | 7/2003 | Romeo et al. | 341/21 |
| 2006/0230340 | A1 | * | 10/2006 | Parsons et al. | 715/514 |
| 2007/0061755 | A1 | * | 3/2007 | Taboada et al. | 715/818 |
| 2007/0211071 | A1 | * | 9/2007 | Slotznick et al. | 345/594 |
| 2008/0035435 | A1 | * | 2/2008 | Anastas et al. | 188/161 |

* cited by examiner

*Primary Examiner* — Chau Nguyen
(74) *Attorney, Agent, or Firm* — Cantor Colburn LLP; Randall Bluestone

(57) ABSTRACT

A method for providing navigational control of paginated electronic information, includes: loading paginated information into an electronic device capable of displaying paginated information in response to a user's selection; determining the total number of pages in the paginated information, and the number and page lengths of chapters, indexes, appendices, and prefaces; calibrating one or more page navigation controls based on the determined total number of pages in paginated document, and number and page length of chapters, indexes, appendices, prefaces; setting detents and resistance points on the navigation controls based on the calibration; changing displayed paginated content in response to the user's positional touch of the one or more navigation controls; wherein the detents and resistance points are implemented virtually in navigational software, or physically with a series of elevations or ridges that interface with the navigational software; and the level of resistance varies in response to the paginated information.

1 Claim, 4 Drawing Sheets

METHOD AND SYSTEM FOR PAGE NAVIGATING USER INTERFACES FOR ELECTRONIC DEVICES

BACKGROUND OF THE INVENTION

1. Field of the Invention

This invention relates generally to touch sensitive user interfaces, and more particularly to a method and system for accessing, and navigating paginated electronic information.

2. Description of the Related Art

The use of Electronic books (e-books) has been gaining increased popularity with the widespread availability of portable computing and handheld electronic display devices. An e-book is a digital media equivalent of a conventional printed book. Information in an e-book may be presented in a scrollable manner, where a user continuously scrolls to navigate through a document or book, or in a paginated manner as a traditional printed on paper book.

E-books provide many advantages over traditional printed books. E-book text may be searched automatically, and cross-referenced using hyperlinks. This makes e-books an excellent choice of format for works that benefit from search and cross-reference capabilities, such as dictionaries, reference works, and certain kinds of textbooks. The electronic nature of e-book text means less physical space is required to store e-books. Hundreds or even thousands of equivalent printed full text volumes may be carried together on one e-book device. For example, approximately 500 average e-books may be stored on one CD (equivalent to several shelves of print books). Because electronic information requires relatively little space, e-books may be offered indefinitely, with no 'out of print' date, allowing authors to continue to earn royalties indefinitely (copyright law permitting), and allowing readers to find older works. With Internet access, the ease and cost associated with distributing e-books is minimal. Readers may begin reading as soon as an e-book download is completed, without the need to visit a bookstore.

E-book readers, who have difficulty reading print books, benefit from the adjustment of text size and font face of the material presented to them. Text-to-speech software may be used to automatically convert e-books to audio books. In addition, some e-books devices allow reading in low light, or even total darkness, with a back-lit device. An e-book may be more comfortable for some to hold, because it does not need to be held open like a paperback. E-books may also be set down and read hands-free.

SUMMARY OF THE INVENTION

Embodiments of the present invention include a method for providing navigational control of paginated electronic information, the method includes: loading paginated information into an electronic device capable of displaying paginated information in response to a user's selection; determining the total number of pages in the paginated information, and the number and page lengths of chapters, indexes, appendices, and prefaces; calibrating one or more page navigation controls based on the determined total number of pages in paginated document, and number and page length of chapters, indexes, appendices, prefaces; setting detents and resistance points on the one or more navigation controls based on the calibration; changing displayed paginated content in response to the user's positional touch of the one or more navigation controls; wherein the detents and resistance points are implemented virtually in navigational software, or physically with a series of elevations or ridges that interface with the navigational software; and wherein the level of resistance of the detents and resistance points varies in response to location within and content of the paginated information.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for an enhanced user interface for accessing, and navigating paginated electronic information displayed on electronic devices.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Despite the acceptance of e-books, there are still areas of user dissatisfaction that are related to page-navigation during e-book usage compared to traditional printed books. Navigation within electronic books on electronic devices is not as quick compared to a physical book. Printed books provide a user with quick and random access to all parts of a book. For quick navigation, for example, a user may do fast scans by releasing pages with a thumb, either with spring-loaded bending of the pages, or via gravity pulling down the released pages. Each page turn makes a slight clicking/paper rustling sound for comforting feedback, and the release/turning of each page is controllable via detent-like page edges interfacing with the user's thumbs. Detents refer to a mechanism that temporarily keeps one part in a certain position relative to another, and can be released by applying force to one of the parts. Page thumbing provides a highly efficient and rapid control for users, allowing nearly immediate navigation to all parts of the book, as well as single-page turning.

Embodiments of the invention provide a page navigation control for electronic book devices that employs detents, which are resistance points, to help guide the user. Common examples of detents include a stereo's balance knob that has a physical "snap-to" detent at the mid-point left-right balance setting to aid a user, or rubber "fingers" on the perimeter of a spinning wheel that act as detents to stop the wheel at clear and valid points. In embodiments of the invention, detent resistance-points may be used for page-level thumbing, as well as, higher-level thumbing across chapters, parts, and other book sections such as appendices, indexes, and prefaces. Detents found in embodiments of the invention may be either virtual or physical resistance points.

In embodiments of the invention, the mechanism to provide the detent-based random-access navigational control of paginated display content to a user is a physical area on the display device, such as a swipable sensing strip, or touch pad. Clicks and resistance points would be provided, virtually via software, or physically with a series of elevations or ridges, along one or more swipe strips to aid the user.

Figure 1:
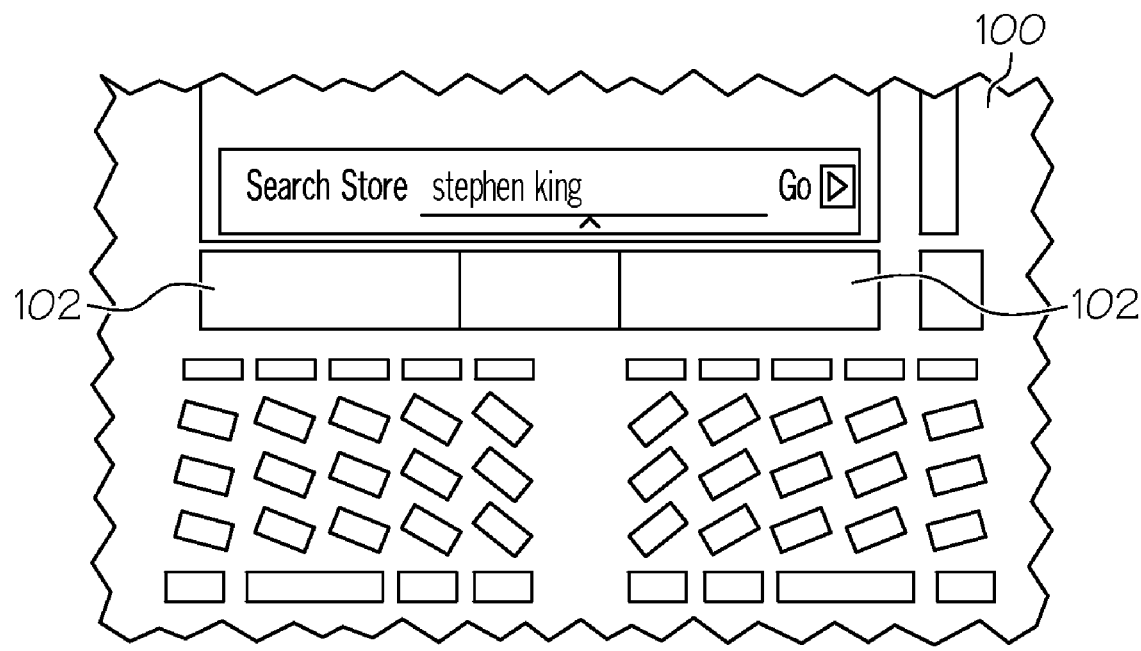
FIG. 1 is a partial top down view of the controls for an e-book or other type of electronic device configured for displaying paginated content, according to embodiments of the invention.

FIG. 1 is a partial top down view of the controls for an e-book or other type of electronic device configured for displaying paginated content, according to embodiments of the invention. In the exemplary device 100 of FIG. 1, two detented swipe strips (touch pads) 102 have been added to accommodate each of a user's thumbs. It is noted that the detented swipe strips 102 could be placed anywhere on the device, including the rear, sides, top, and bottom, as well as vertically, diagonally, etc.

Figure 2:
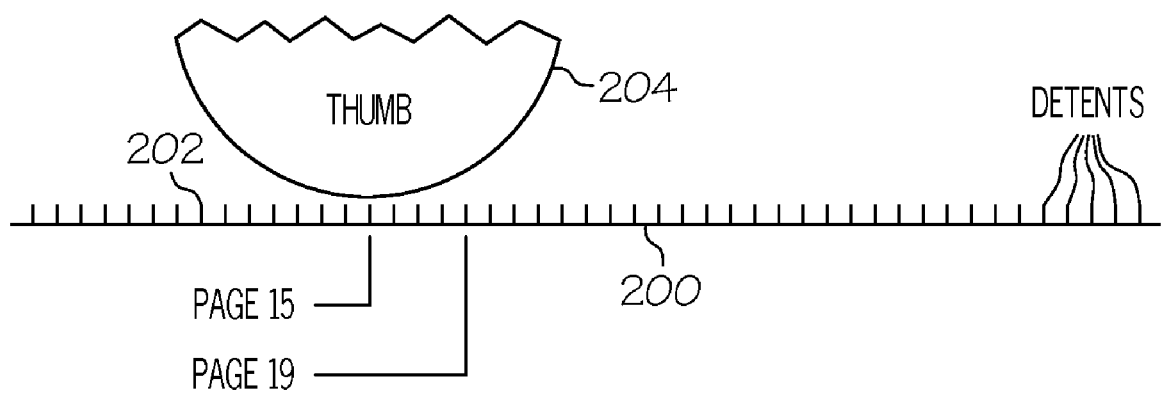
FIG. 2 is a side perspective view of a detented swipe strip, with detent resistance lines shown, according to embodiments of the invention.

FIG. 2 is a side view of a detented swipe strip 200, with detent resistance lines 202 shown, according to embodiments of the invention. In the exemplary embodiment of FIG. 2, a user's thumb 204 (or other digit or stylus) is currently in a position where page 15 is being displayed on an electronic device, such as the device 100 of FIG. 1. As the user swipes their thumb 204 to the right the displayed page increases. Conversely, movement to the left will cause the displayed page to be lower. As previously noted, the detents 202 may be implemented virtually in software, or physically with a series of elevations or ridges.

The detents of FIG. 2 are evenly distributed, with each detent ridge (resistance line) associated with a page. A user swipes their thumb in one direction multiple times to move across a large portion of a book or paginated content. The detents may be handled in the software via continuous virtual resistance points, wherein the level of resistance of the detents and resistance points varies in response to location within and content of the paginated information, with more resistance for some pages than others, such as chapter demarcation pages, index, assigned pages for a reading assignment, etc.

Figure 3:
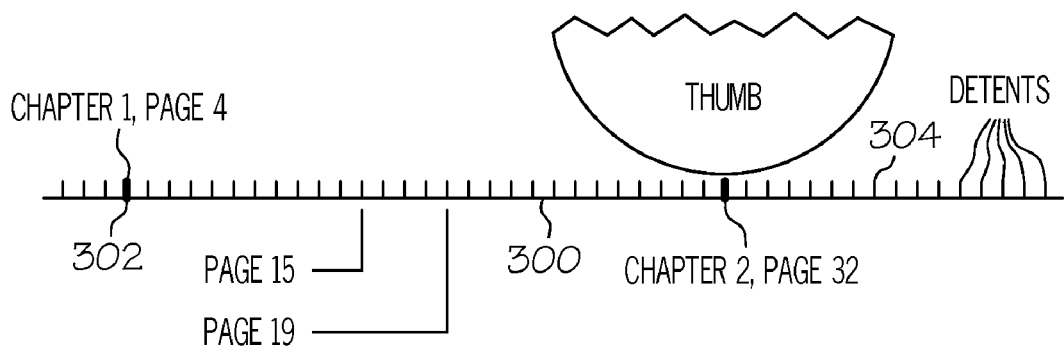
FIG. 3 is side perspective view of a detented swipe stripe with Chapter detents added with the page detents, according to embodiments of the invention.
Figure 4:
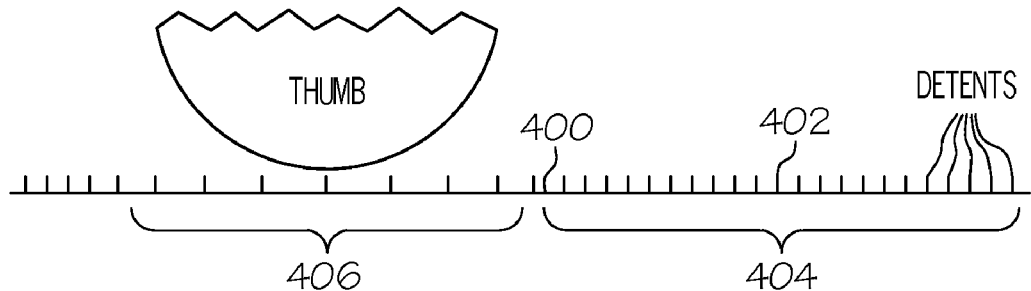
FIG. 4 is a side perspective view of a detented swipe strip with varied spacing of the detents, according to embodiments of the invention.

FIG. 3 is side perspective view of a detented swipe stripe 300 with Chapter detents 302 added with the page detents 304, according to embodiments of the invention. The chapter detents 302 act as higher resistance points. The higher resistance points make it easier for a user to stop at critical demarcations in paginated information, such as chapters, FIG. 4 is a side perspective view of a detented swipe strip 400 with varied spacing of the detents 402, with lower-gain control for near-page navigation (thumbing) (region 406) and higher-gain control (region 404) for whole-book thumbing.

Figure 5:
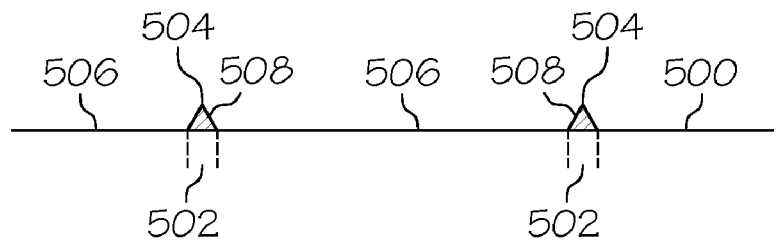
FIG. 5 is a side perspective view of a detented swipe strip, and provides a close up view of detent operation, according to embodiments of the invention.

FIG. 5 is a side perspective view of a detented swipe strip 500, and provides a close up view of detent operation, according to embodiments of the invention. Between the detents 508 the swipe strips regions 506 provide a high gain (amount of finger movement per paging) control of the page navigation. Within the lower-gain areas 502 of the detents the gain could vary, with a point of lowest gain 504 providing the most relative resistance to finger movement. The low gain points 504 may also be the point at which other effects are given to a user. Effects may include aural indicators (for example, soft clicks or "tics"), and tactile feedback, such as vibration.

Figure 6:
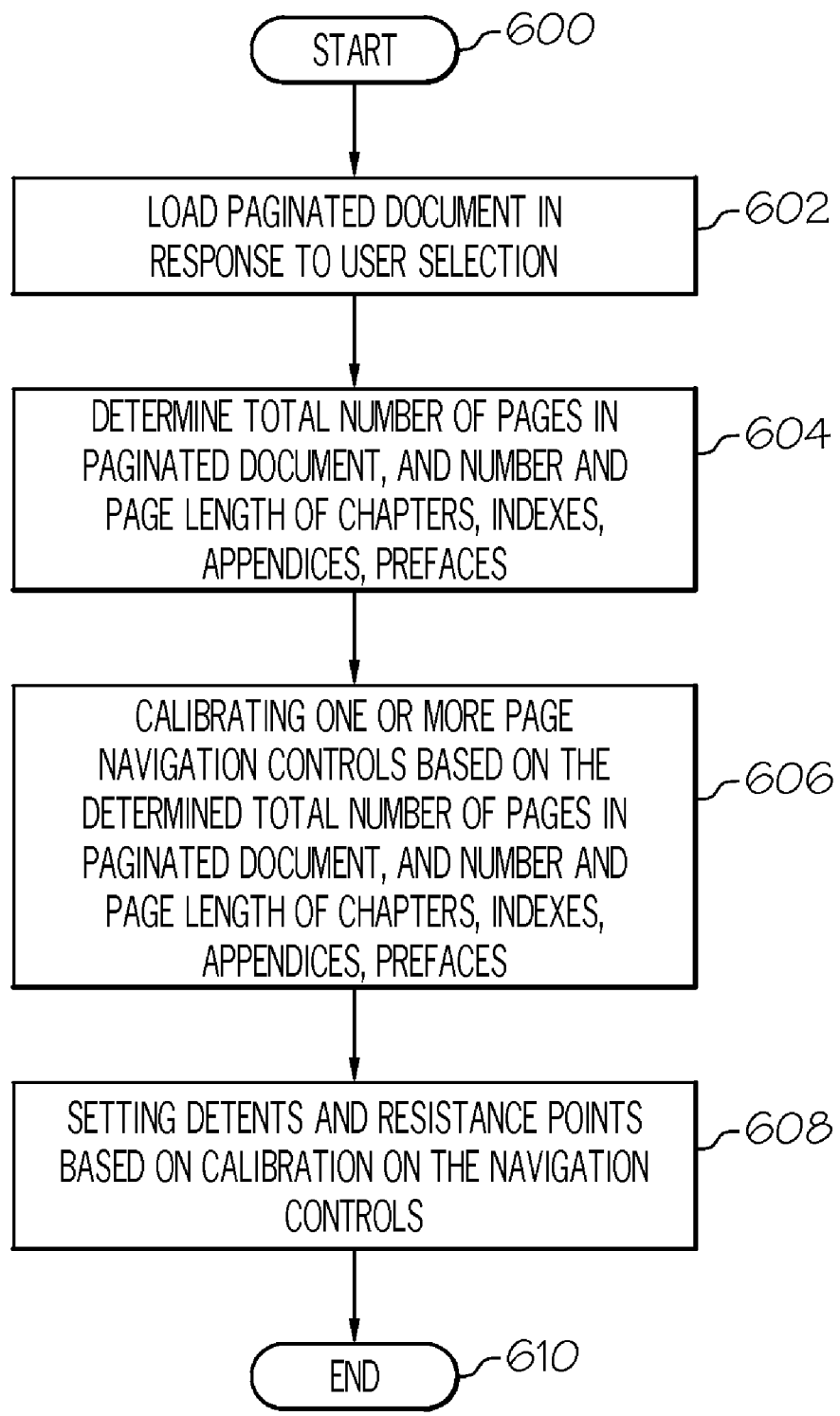
FIG. 6 illustrates a flow chart for a method for an enhanced user interface for accessing, and navigating paginated electronic information displayed on electronic devices, according to embodiments of the invention.

FIG. 6 illustrates a flow chart for a method for an enhanced user interface for accessing, and navigating paginated electronic information displayed on electronic devices, according to embodiments of the invention. The process starts (block 600) with the loading of paginated information into an electronic device capable of displaying paginated information based on a user's selection (block 602). The electronic device determines the total number of pages in the paginated information, and the number and page lengths of chapters, indexes, appendices, and prefaces (block 604). The electronic device calibrates one or more page navigation controls (touch pads) based on the determined total number of pages in paginated document, and number and page length of chapters, indexes, appendices, prefaces (block 606), and sets detents and resistance points on the navigation controls based on the calibration (block 608). Subsequently the navigation controls are ready for the user to navigate through the selected paginated document, and the process ends (block 610).

Figure 7:
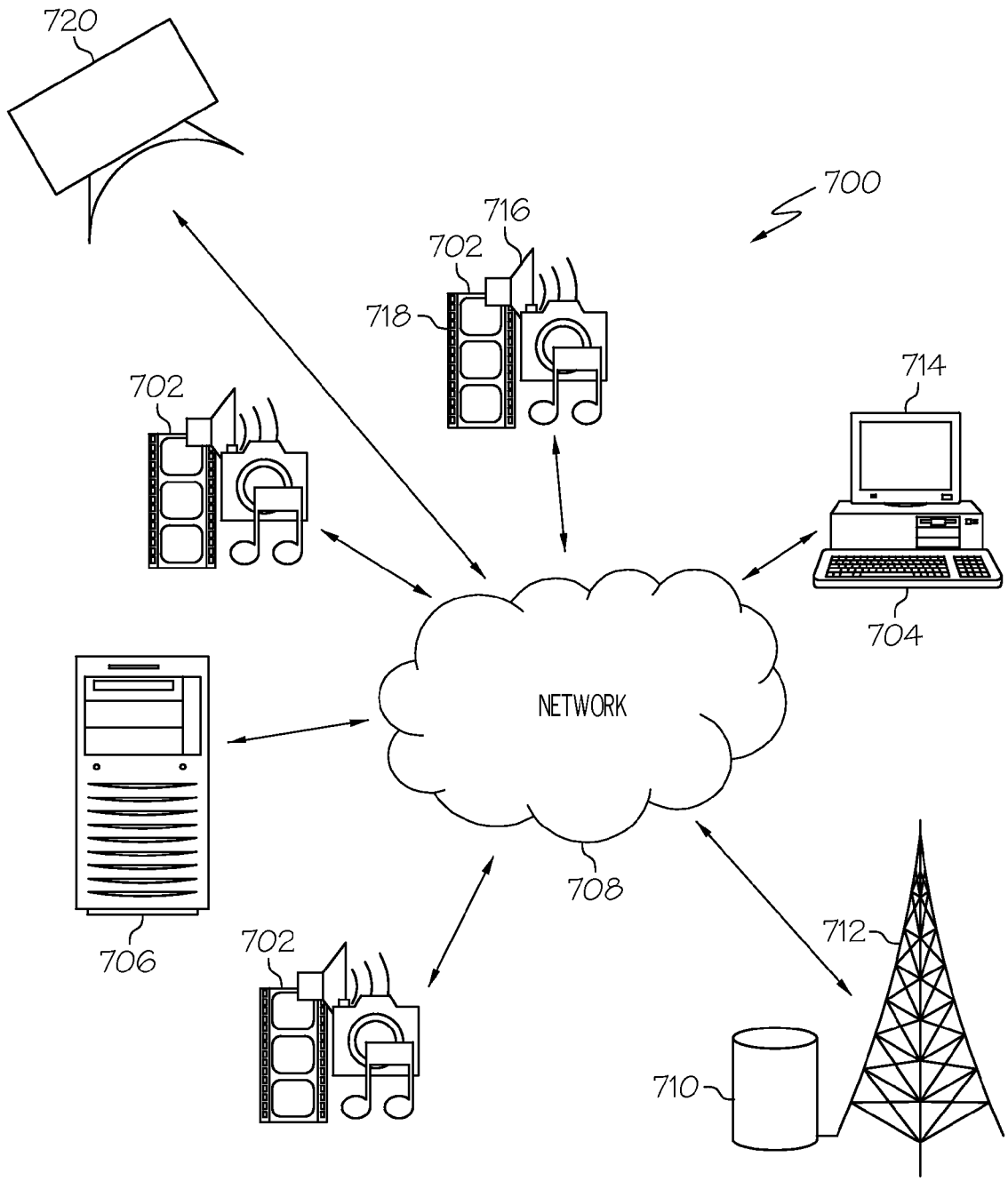
FIG. 7 illustrates a system for implementing embodiments of the invention.

FIG. 7 illustrates an exemplary system 700 for implementing an enhanced user interface for accessing, and navigating paginated electronic information displayed on electronic devices. The system 700 includes multimedia devices 702, and desktop computer devices 704 configured with display capabilities 714. The multimedia devices 702 may be mobile communication and entertainment devices, such as cellular phones and mobile computing devices that are wirelessly connected to a network 708. The multimedia devices 702 have video displays 718 and audio outputs 716. The multimedia devices 702 and desktop computer devices 704 may be configured with swipe strips for enhanced navigation of paginated information according to embodiments of the invention. The network 708 may be any type of known network including a fixed wire line network, cable and fiber optics, over the air broadcasts, satellite 720, local area network (LAN), wide area network (WAN), global network (e.g., Internet), intranet, etc. with data/Internet capabilities as represented by server 706. Communication aspects of the network are represented by cellular base station 710 and antenna 712.

Paginated information may be resident on the individual multimedia devices 702 and desktop computers 704, or stored within the server 706 or cellular base station 710.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for providing navigational control of paginated electronic information, the method comprising:
    loading paginated information into an electronic device capable of displaying paginated information in response to a user's selection;
    determining the total number of pages in the paginated information, and the number and page lengths of chapters, indexes, appendices, and prefaces;
    calibrating one or more page navigation controls that are formed with one or more touch pads, based on the determined total number of pages in paginated document, and number and page length of chapters, indexes, appendices, prefaces;
    setting detents and resistance points on the one or more navigation controls based on the calibration;
    changing displayed paginated content in response to the user's positional touch of the one or more navigation controls;
    wherein the detents and resistance points are implemented in at least one of: virtually in navigational software, and physically with a series of elevations or ridges that interface with the navigational software; and
    wherein the level of resistance of the detents and resistance points varies in response to location within and content of the paginated information.

* * * * *